United States Patent
Gauba et al.

(10) Patent No.: US 9,392,584 B2
(45) Date of Patent: Jul. 12, 2016

(54) USER EQUIPMENT CONTROL IN A MULTI-CORE LONG TERM EVOLUTION SYSTEM

(71) Applicant: Sprint Communications Company L.P., Overland Park, KS (US)

(72) Inventors: Maneesh Gauba, Overland Park, KS (US); Stephen R. Bales, Lee's Summit, MO (US); Dwight Edward Patton, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 214 days.

(21) Appl. No.: 14/323,030

(22) Filed: Jul. 3, 2014

(65) Prior Publication Data

US 2016/0007331 A1    Jan. 7, 2016

(51) Int. Cl.
  *H04W 72/04*    (2009.01)
  *H04W 92/02*    (2009.01)
  *H04W 8/06*    (2009.01)
  *H04W 8/08*    (2009.01)

(52) U.S. Cl.
  CPC ............ *H04W 72/0406* (2013.01); *H04W 8/06* (2013.01); *H04W 92/02* (2013.01); *H04W 8/08* (2013.01)

(58) Field of Classification Search
  CPC ... H04W 72/0406; H04W 92/02; H04W 8/06; H04W 8/08
  See application file for complete search history.

(56) References Cited

U.S. PATENT DOCUMENTS

| | | | |
|---|---|---|---|
| 8,385,286 B2 | 2/2013 | Junell et al. | |
| 8,412,247 B2 | 4/2013 | Junell et al. | |
| 8,428,610 B2 | 4/2013 | Chowdhury et al. | |
| 2011/0176530 A1 | 7/2011 | Vikberg et al. | |
| 2011/0269499 A1* | 11/2011 | Vikberg | H04W 28/08 455/524 |
| 2012/0063430 A1* | 3/2012 | Suh | H04W 48/16 370/338 |
| 2012/0264455 A1* | 10/2012 | Yasuoka | H04L 67/1002 455/456.2 |
| 2012/0302230 A1* | 11/2012 | Lim | H04W 76/021 455/422.1 |
| 2012/0320817 A1 | 12/2012 | Xu et al. | |
| 2013/0053072 A1* | 2/2013 | Herbelin | H04W 60/00 455/456.5 |
| 2013/0083650 A1 | 4/2013 | Taleb et al. | |
| 2013/0188555 A1 | 7/2013 | Olsson et al. | |
| 2013/0196677 A1 | 8/2013 | Smith et al. | |
| 2014/0169269 A1* | 6/2014 | Salot | H04W 48/20 370/328 |
| 2014/0313889 A1* | 10/2014 | Jeong | H04W 76/028 370/230 |
| 2014/0347990 A1* | 11/2014 | Chimbili | H04W 28/08 370/235 |

(Continued)

FOREIGN PATENT DOCUMENTS

| CN | 102123464 B | 8/2013 |
|---|---|---|
| EP | 2079253 | 7/2009 |

(Continued)

OTHER PUBLICATIONS

3GPP TS 23.401 v12.5.0 (Jun. 2014).*

*Primary Examiner* — Jae Y Lee

(57) ABSTRACT

In a Long Term Evolution (LTE) communication system, a User Equipment (UE) receives Mobility Management Entity (MME) selection data. The UE processes the MME selection data to select one of multiple MMEs. The UE wirelessly transfers an LTE attachment request to an LTE access point. The LTE attachment request indicates the selected MME. The UE wirelessly receives an attachment acceptance from the selected MME through the LTE access point in response to selecting and indicating the MME in the LTE attachment request.

20 Claims, 6 Drawing Sheets

(56) References Cited

U.S. PATENT DOCUMENTS

| | | | | |
|---|---|---|---|---|
| 2015/0071171 A1* | 3/2015 | Akiyoshi | ................ | H04L 49/70 370/328 |
| 2015/0146519 A1* | 5/2015 | Zakrzewski | ............ | H04W 8/30 370/221 |
| 2015/0201394 A1* | 7/2015 | Qu | .......................... | H04W 4/02 455/456.1 |
| 2015/0312841 A1* | 10/2015 | Sirotkin | .............. | H04W 40/246 370/254 |
| 2015/0350874 A1* | 12/2015 | Draznin | .................. | H04W 8/12 455/432.1 |

FOREIGN PATENT DOCUMENTS

| EP | 2557859 | 2/2013 |
|---|---|---|
| EP | 2747376 | 6/2014 |

\* cited by examiner

USER EQUIPMENT CONTROL IN A MULTI-CORE LONG TERM EVOLUTION SYSTEM

TECHNICAL BACKGROUND

In the field of wireless communications, Long Term Evolution (LTE) networks provide User Equipment (UE) with internet access, voice calling, and other mobile data services. The LTE networks have various network elements, such as eNodeBs, gateways, authentication databases, media servers, and control systems. One of the control systems is a Mobility Management Entity (MME). The MME manages UEs, and an LTE network may have multiple MMEs.

LTE networks deploy eNodeBs and other LTE access points across wide geographic areas. These LTE edge systems are coupled to LTE core networks, and there are multiple LTE core networks. The typical LTE core network includes its own MMEs, gateways, media servers, and authorization databases. The LTE access points select an LTE core network for the UE during LTE network attachment. The selection of the LTE core network includes the selection of an MME from multiple MMEs. Thus, the LTE edge systems select the MME for the UE during network attachment. The MME selection is typically based on a subscriber/device identity provided by the UE during attachment. The MME selection may be based on load balancing across a pool of MMEs serving a common core.

The current techniques for user control over LTE core network selection are not efficient or effective. In particular, user control over MME selection is not adequate.

TECHNICAL OVERVIEW

In a Long Term Evolution (LTE) communication system, a User Equipment (UE) receives Mobility Management Entity (MME) selection data. The UE processes the MME selection data to select one of multiple MMEs. The UE wirelessly transfers an LTE attachment request to an LTE access point. The LTE attachment request indicates the selected MME. The UE wirelessly receives an attachment acceptance from the selected MME through the LTE access point in response to selecting and indicating the MME in the LTE attachment request.

DETAILED DESCRIPTION

Figure 1:
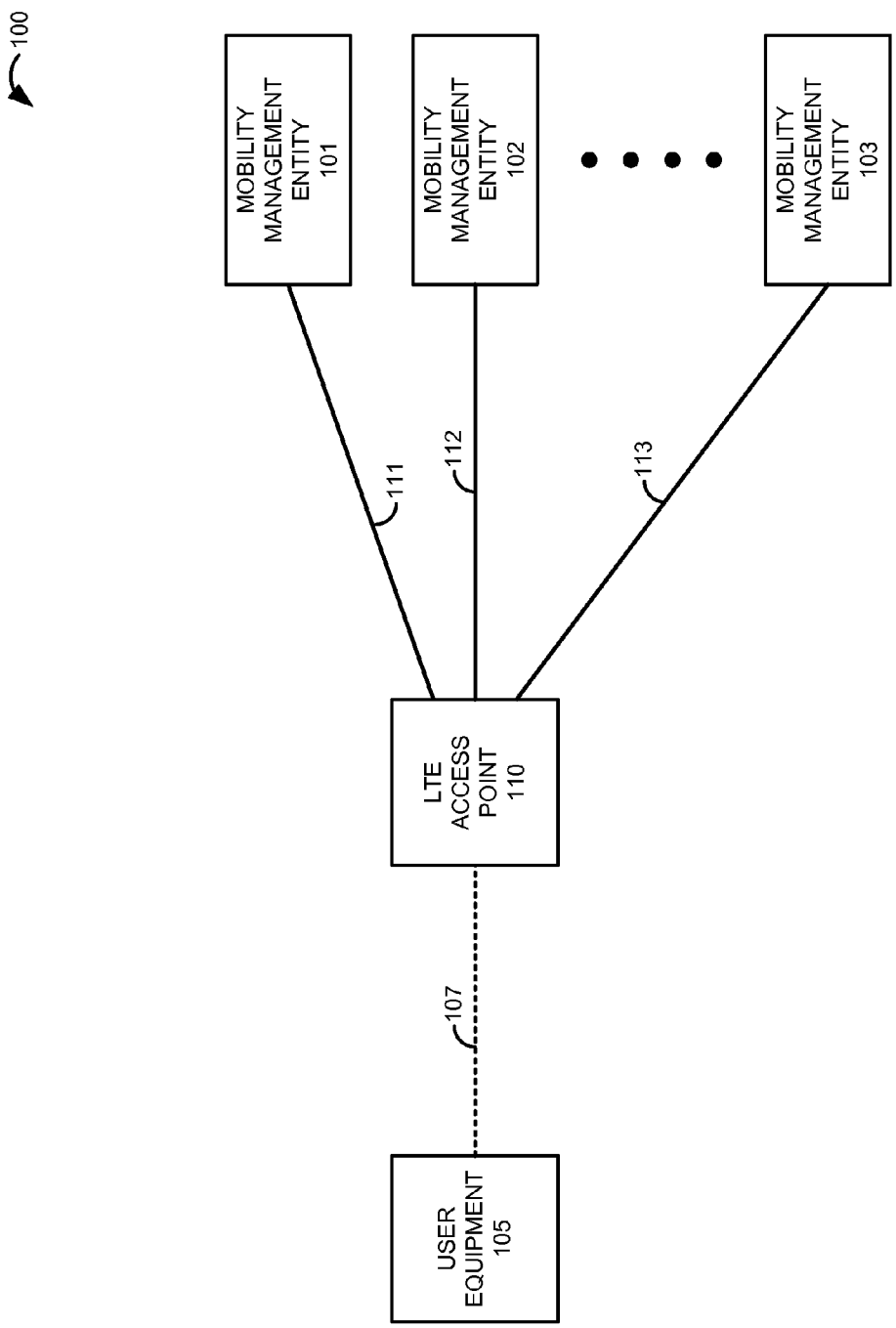
FIG. 1-2 illustrate a communication system to facilitate UE control in a multi-MME LTE system.
Figure 2:
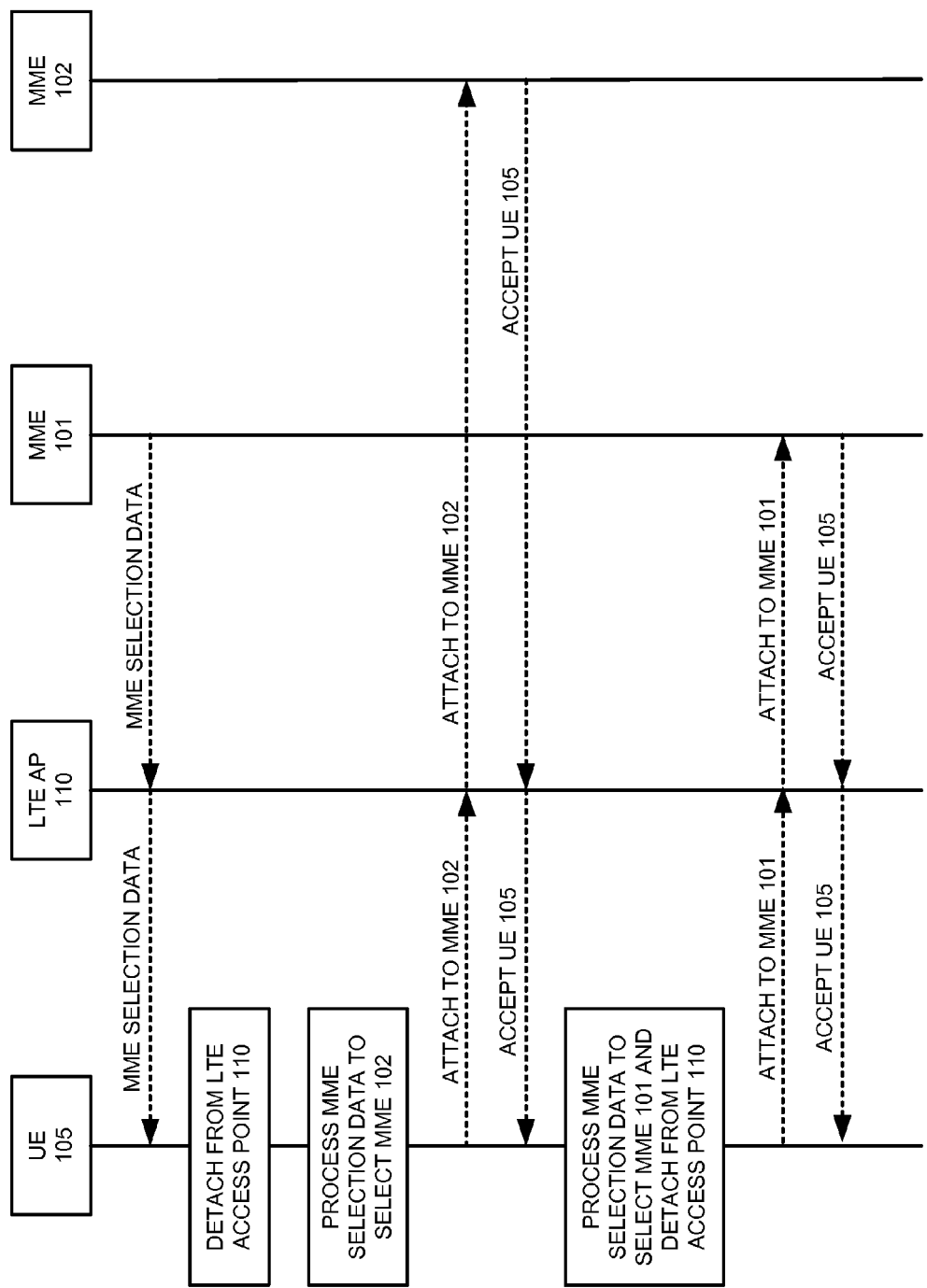

FIGS. 1-2 illustrate communication system 100 to facilitate User Equipment (UE) control in a Long Term Evolution (LTE) system having multiple Mobility Management Entities. (MMEs). Communication system 100 comprises MMEs 101-103, UE 105, and LTE access point 110. UE 105 and LTE access point 110 communicate over wireless LTE link 107. LTE access point 110 and MMEs 101-103 communicate over respective LTE network links 111-113. LTE links 107 and 111-113 may traverse various devices, systems, and/or networks.

MMEs 101-103 reside in separate core networks that comprise computer and communication equipment, software, and data structures. UE 105 comprises a phone, computer, media player, internet appliance, or some other apparatus having LTE communication components. LTE access point 110 comprises an eNodeB, radio relay, femtocell, hotspot, or the like.

In operation, UE 105 receives MME selection data. This MME data receipt may occur during manufacture, activation, user configuration, or at some other time. UE 105 processes the MME selection data to select any one of MMEs 101-103—with MME 102 being selected in this example. UE 105 wirelessly transfers an LTE attachment request to LTE access point 110. The LTE attachment request indicates the selected MME 102. The selected MME can be indicated by MME name, network address, or some other identity code. UE 105 may detach or initiate a reattach procedure before transferring the attachment request. UE 105 then wirelessly receives an attachment acceptance from the selected MME 102 through the LTE access point 110. The acceptance is responsive to UE 105 indicating the selected MME 102 in the LTE attachment request to LTE access point 110.

In some examples, UE 105 graphically displays a mode selection interface to a user and receives a user mode instruction responsive to the mode selection interface. UE 105 selects MME 102 based on the user mode instruction. In some examples, UE 105 graphically displays a network selection interface to a user and receives a user network instruction responsive to the network selection interface. UE 105 selects MME 102 based on the user network instruction. In some examples, UE 105 graphically displays a user access interface to a user and receives a user access code responsive to the network selection interface. UE 105 selects MME 102 based on the user access code. Thus, UE 105 can provide secure user control over MME and core network selection.

In some examples, UE 105 processes the MME selection data and the current time of day to select MME 102. In some examples, UE 105 processes the MME selection data and the current date to select MME 102. In some examples, UE 105 processes the MME selection data and the current UE location to select MME 102. In some examples, UE 105 processes the MME selection data and the current UE mobility status to select MME 102. Thus, UE 105 may be configured to access different MMEs and core networks based on different times, days, dates, locations, and movements—including combinations thereof.

For example, the user may operate UE 105 to set MME selection rules for work and home by time and geography. From six A.M. until six P.M. during week days, the UE could automatically select MME 102 if UE 105 is in a geographic zone that is near the office as defined by the user. Outside of work times and geographies, the UE automatically uses MME 101.

Referring to FIG. 2, MME 101 transfers MME selection data to UE 105 through LTE access point 110. MME selection data comprises software codes and other data to control MME selection and possibly drive Graphical User Interfaces (GUIs) for the user. Eventually, UE 105 detaches from LTE access point 110 and MME 101. UE 105 processes the MME selection data to select any one of MMEs 101-103—MME 102 in this example. UE 105 wirelessly transfers an LTE attachment request to LTE access point 110 indicating the selected MME 102. LTE access point 110 transfers a version of the LTE attachment request indicating the selected MME 102 to MME 102. MME 102 authorizes UE 105—possibly through remote data access—and returns a UE attachment acceptance to UE 105 through LTE access point 110.

UE 105 may then exchange wireless data for various services over the associated LTE core network for MME 102. If desired, the different core networks may be provide different levels of services and costs. Some of these core networks may be specially purposed for work, emergency, gaming, mobility, security, video, and the like.

UE 105 subsequently processes the MME selection data to select another one of MMEs 101-103, and MME 101 is now selected. Responsive to the MME/Core switch, UE 105 detaches from LTE access point 110 and MME 102. UE 105 wirelessly transfers an LTE attachment request to LTE access point 110 indicating the newly selected MME 101. LTE access point 110 transfers a version of the LTE attachment request indicating the selected MME 101 to MME 101. MME 101 authorizes UE 105—possibly through remote data access—and returns a UE attachment acceptance to UE 105 through LTE access point 110. UE 105 may then exchange wireless data for various services over the associated LTE core network for MME 101.

In various examples, UE 105 may graphically display a user interface and receive user instructions in response. UE 105 may then select MMEs based on the user instructions. UE 105 may also select MMEs based on the current time, day, date, location, mobility status, or other information—including combinations thereof.

Figure 3:
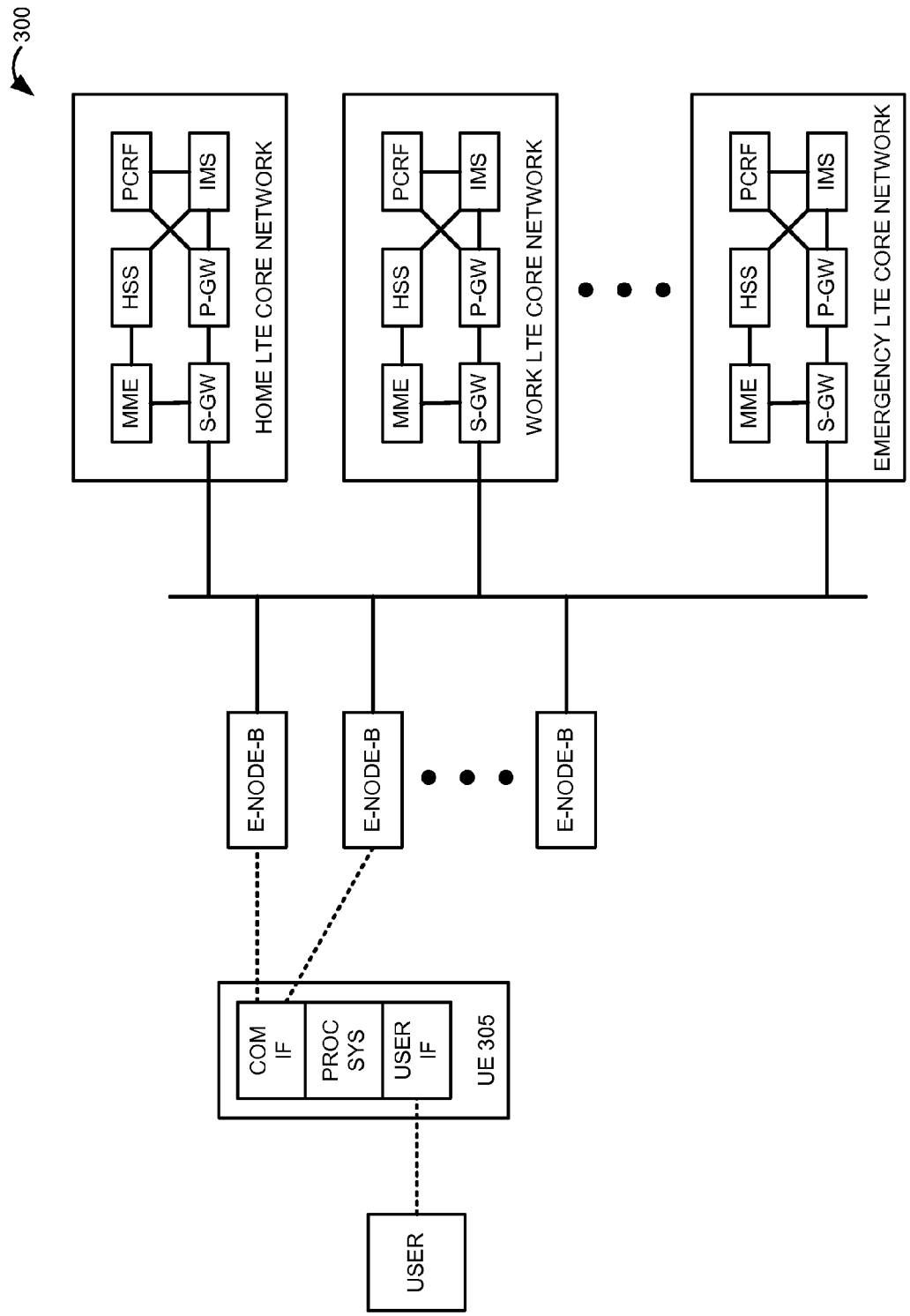
FIGS. 3-5 illustrate a communication system to facilitate UE control in a multi-core LTE system.

FIG. 3 illustrates communication system 300 to facilitate User Equipment (UE) control in a multi-core Long Term Evolution (LTE) system. Communication system 300 is an example of communication system 100, although system 100 may use alternative configurations and operations. Communication system 300 comprises UE 305, multiple eNodeBs, and multiple LTE core networks.

UE 305 comprises a communication interface, processing system, and user interface. The user interface interacts with a user of UE 305 and the processing system. The communication interface communicates between the processing system and the eNodeBs. The user controls UE 305 to communicate with multiple LTE core networks over multiple eNodeBs.

The LTE core networks comprise a home core, work core, and a mobile core, although the number and types of core networks may vary. Each LTE core network comprises: a Service Gateway (S-GW), Packet Data Network Gateway (P-GW), Mobility Management Entity (MME), Home Subscriber System (HSS), Policy Charging and Rules Function (PCRF), and Internet Multimedia Subsystem (IMS). Note that an MME in a core does not share gateways with another MME in different core. Although the LTE core networks are separate from one another, the separation can be accomplished by the use of separate virtual machines operating on a common data processing platform. Thus, the separate cores would use separate virtual machines.

Figure 4:
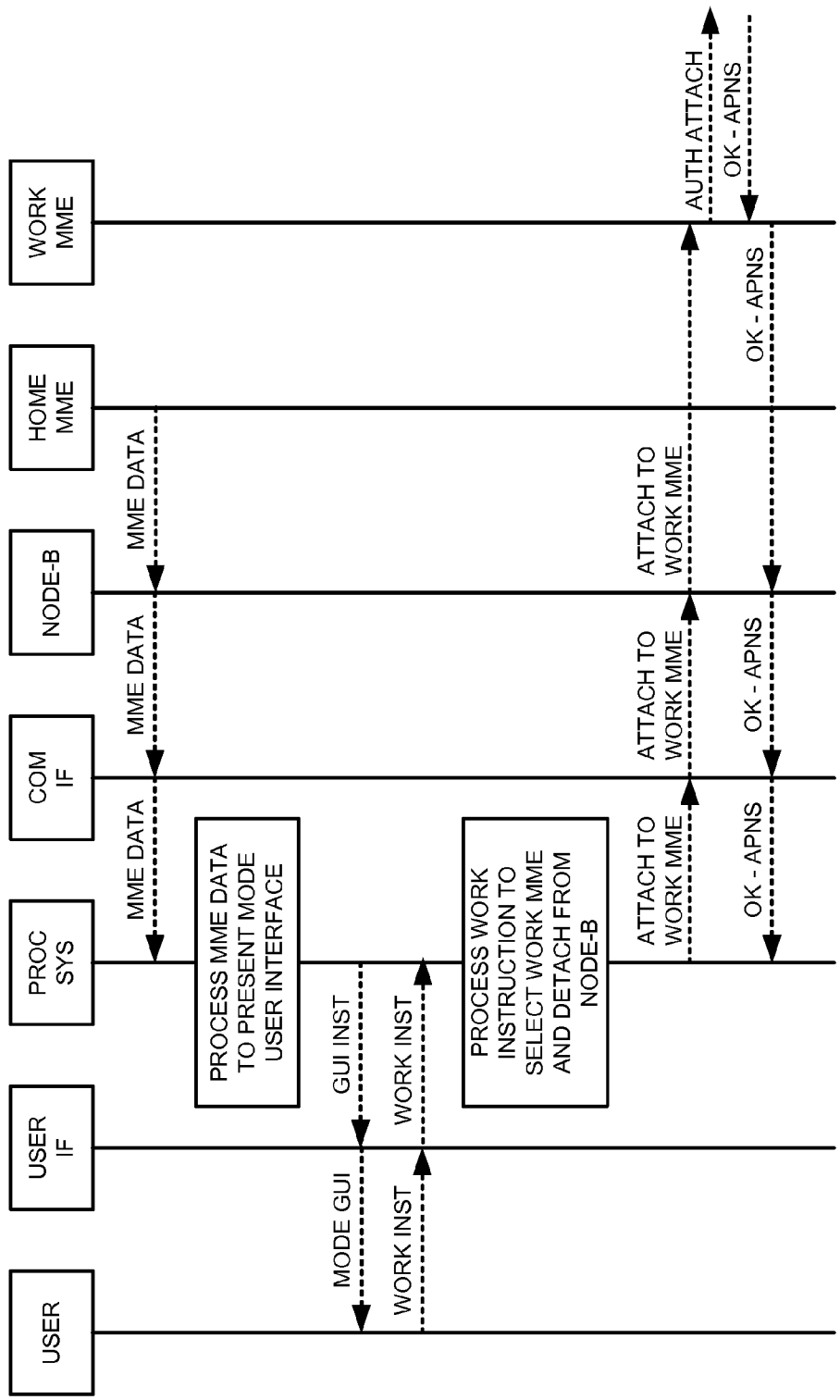
Figure 5:
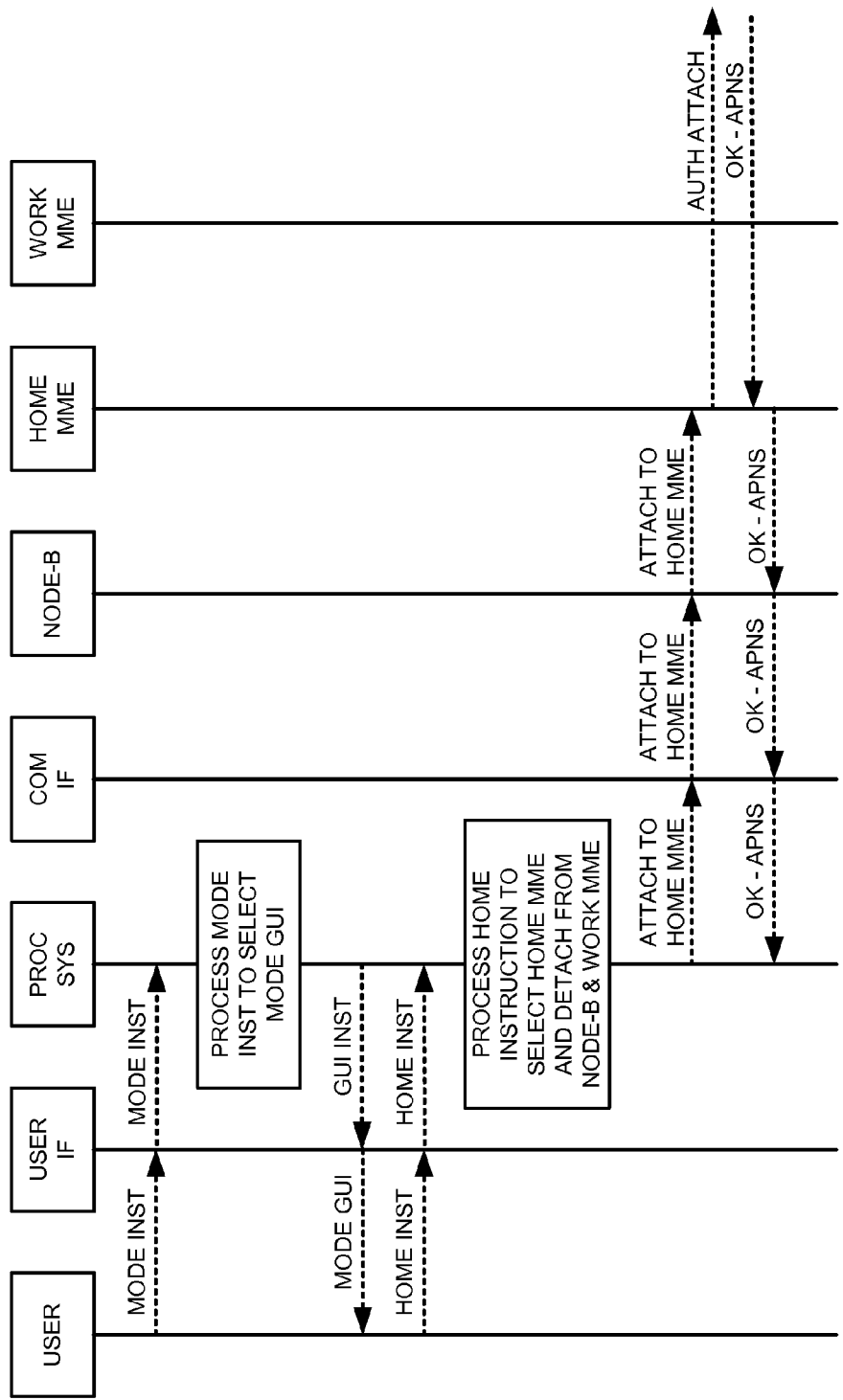

FIGS. 4-5 illustrates the operation of communication system 300 to facilitate UE 305 control in a multi-core LTE system. The home MME 101 transfers MME selection data to the communication interface of UE 305 through an eNodeB, and the communication interface transfers the MME selection data to the processing system for storage and execution. The MME selection data comprises a software application and data structure to control MME selection through user GUIs.

The processing system in UE 305 processes the MME data to transfer GUI instructions to the user interface in UE 305, and the user interface presents a network mode GUI to the user. For example, the user interface may display a list of operating modes (home, work, mobile, gaming, video . . . ) and allow for user selection. In other examples, the user interface may allow the user to specify network mode selection rules based on time of day, day, date, mobility status, location, or some other metrics—including combinations thereof.

For example, the user may operate the user interface to set core network rules for work and home by time and geography. From six A.M. until six P.M. during week days, the UE could automatically enter the work mode if the UE is in a geographic zone that is near the office as defined by the user. Outside of work times and geographies, the UE automatically uses the home core.

In this example, the user selects the work mode or provides geographic/time rules to trigger a work mode instruction. The user provides the work mode instruction to the processing system through the user interface. The UE processing system processes the work mode instruction (or rules to trigger the instruction) to select the work MME in the work LTE core network. To initiate the switch from the home core to the work core, the UE processing system directs the communication interface to detach from the eNodeB and re-attach indicating the selected work MME.

The communication interface transfers an LTE attachment request to the eNodeB indicating the selected work MME. The eNodeB transfers a version of the LTE attachment request indicating the selected work MME to the work MME in the work core. The work MME authorizes the UE 305 through local HSS access and returns an attachment acceptance for the UE 305 through the eNodeB. The acceptance includes Access Point Names (APNs) for services such as internet access, voice calling, gaming, video, messaging, file transfers, and the like. The work MME transfers attachment acceptance and APNs for UE 305 to the UE communication interface through the eNodeB, and the communication interface transfers the attachment acceptance and APNs to the processing system. UE 305 may then exchange wireless data for various services over the work LTE core network using the work mode APNs.

Referring to FIG. 5, the user provides a mode instruction to the processing system through the user interface. For example, the user may touch a network mode icon on a touch screen. The processing system processes mode instruction to transfer GUI instructions to the user interface, and the user interface presents the network mode GUI to the user. In this example, the user now selects the home mode (or provides geographic/time rules to trigger a home mode instruction). The user provides the home mode instruction to the processing system through the user interface. The UE processing system processes the home mode instruction (or rules to trigger the instruction) to select the home MME in the home LTE core network. To initiate the switch from the work core to the home core, the UE processing system directs the communication interface to detach from the eNodeB and re-attach indicating the selected home MME.

The communication interface transfers an LTE attachment request to the eNodeB indicating the selected home MME. The eNodeB transfers a version of the LTE attachment request indicating the selected home MME to the home MME in the home core. The home MME authorizes UE 305 through local HSS access and returns an attachment acceptance for the UE 305 through the eNodeB. The acceptance includes Access Point Names (APNs) for services such as internet access, voice calling, gaming, video, messaging, file transfers, and the like. The home MME transfers attachment acceptance and APNs for UE 305 to the UE communication interface through the eNodeB, and the communication interface transfers the attachment acceptance and APNs to the processing system. UE 305 may then exchange wireless data for various services over the home LTE core network using the home mode APNs.

Figure 6:
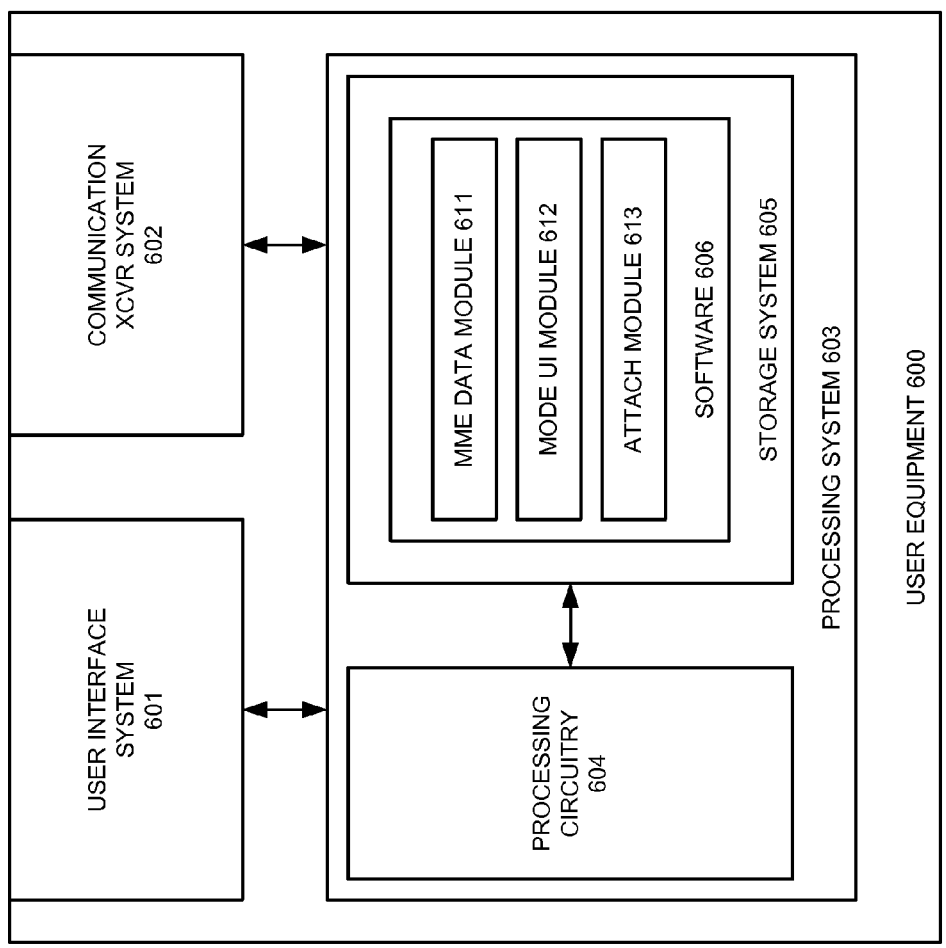
FIG. 6 illustrates an LTE UE to control a multi-core LTE system.

FIG. 6 illustrates LTE UE 600 to control a multi-core LTE system. LTE UE 600 is an example of UEs 105 and 305, although these UEs may use alternative configurations and operations. LTE UE 600 comprises user interface system 601, communication transceiver system 602, and processing system 603. Processing system 603 comprises processing circuitry 604 and storage system 605. Storage system 605 stores software 606. Software 606 includes software modules 611-613. Some conventional aspects of LTE UE 600 are omitted for clarity, such as power supplies, enclosures, and the like. LTE UE 600 may be centralized or distributed and may include various virtualized components.

User interface system 601 comprises graphical displays, speakers, microphones, cameras, touch surfaces, switches, keys, sensors, and the like. User interface system 601 may comprise a touch-screen on a tablet or smartphone. Under the control of processing system 603, user interface system 601 presents network control GUIs and collects user control instructions.

Communication transceiver system 602 comprises communication components, such as antennas, amplifiers, modulators, filters, ports, signal processing circuitry, memory, software, and the like. Communication transceiver system 602 uses the LTE protocol but may use other communication formats as well, including Wireless Fidelity, Ethernet, and Internet Protocol among others. Under the control of processing system 603, communication transceiver system 602 indicates the MME that was selected by the user or UE in the LTE attachment signaling.

In processing system 603, processing circuitry 604 comprises circuit boards, integrated circuitry, and associated electronics. Storage system 605 comprises non-transitory, machine-readable, data storage media, such as flash drives, disc drives, memory circuitry, servers, and the like. Software 606 comprises machine-readable instructions that control the operation of processing circuitry 604 when executed. Software 606 includes modules 611-613 and may also include operating systems, applications, utilities, databases, and the like. All or portions of software 606 may be externally stored on one or more storage media, such as flash drives, discs, servers, and the like.

When executed by processing circuitry 604, MME data module 611 directs circuitry 604 to process MME data and other data to select MMEs for UE 600. When executed by processing circuitry 604, mode UI module 612 directs circuitry 604 to drive user GUIs to collect MME/core network instructions from the user. When executed by processing circuitry 604, attach module 613 directs circuitry 604 to indicate the selected MMEs in LTE attachment signaling.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating Long Term Evolution (LTE) User Equipment (UE) to use different Mobility Management Entities (MMEs), the method comprising:
   receiving MME selection data into the UE and processing the MME selection data to select one of the MMEs;
   wirelessly transferring an LTE attachment request to an LTE access point and indicating the selected one of the MMEs in the LTE attachment request; and
   wirelessly receiving an attachment acceptance from the selected one of the MMEs through the LTE access point responsive to indicating the selected one of the MMEs in the LTE attachment request.

2. The method of claim 1 wherein processing the MME selection data to select the one of the MMEs comprises graphically displaying a mode selection interface, receiving a user mode instruction responsive to the mode selection interface, and selecting the one of the MMEs based on the user mode instruction.

3. The method of claim 1 wherein processing the MME selection data to select the one of the MMEs comprises graphically displaying an LTE network selection interface, receiving a user network instruction responsive to the LTE network selection interface, and selecting the one of the MMEs based on the user network instruction.

4. The method of claim 1 wherein processing the MME selection data to select the one of the MMEs comprises graphically displaying a user access interface, receiving a user access code responsive to the user access interface, and selecting the one of the MMEs based on the user access code.

5. The method of claim 1 wherein the different MMEs use separate LTE core networks.

6. The method of claim 1 wherein the different MMEs use separate LTE gateways.

7. The method of claim 1 wherein processing the MME selection data to select the one of the MMEs comprises processing a current time of day to select the one of the MMEs.

8. The method of claim 1 wherein processing the MME selection data to select the one of the MMEs comprises processing a current date to select the one of the MMEs.

9. The method of claim 1 wherein processing the MME selection data to select the one of the MMEs comprises processing a current UE location to select the one of the MMEs.

10. The method of claim 1 wherein processing the MME selection data to select the one of the MMEs comprises processing a current UE mobility status to select the one of the MMEs.

11. A Long Term Evolution (LTE) User Equipment (UE) to use different Mobility Management Entities (MMEs), the LTE UE comprising:
   a processing system configured to process MME selection data to select one of the MMEs;
   a communication interface configured to wirelessly transfer an LTE attachment request to an LTE access point and indicate the selected one of the MMEs in the LTE attachment request; and
   the communication interface configured to wirelessly receive an attachment acceptance from the selected one of the MMEs through the LTE access point responsive to indicating the selected one of the MMEs in the LTE attachment request.

12. The LTE UE of claim 11 wherein the processing system is configured to direct a graphical display of a mode selection interface, receive a user mode instruction through to the mode selection interface, and select the one of the MMEs based on the user mode instruction.

13. The LTE UE of claim 11 wherein the processing system is configured to direct a graphical display of an LTE network selection interface, receive a user network instruction through the LTE network selection interface, and select the one of the MMEs based on the user network instruction.

14. The LTE UE of claim 11 wherein the processing system is configured to direct a graphical display of a user access interface, receive a user access code through the user access interface, and select the one of the MMEs based on the user access code.

15. The LTE UE of claim 11 wherein the different MMEs use separate LTE core networks.

16. The LTE UE of claim 11 wherein the different MMEs use separate LTE gateways.

17. The LTE UE of claim 11 wherein the processing system is configured to select the one of the MMEs based on a current time of day.

18. The LTE UE of claim 11 wherein the processing system is configured to select the one of the MMEs based on a current date.

19. The LTE UE of claim 11 wherein the processing system is configured to select the one of the MMEs based on a current UE location.

20. The LTE UE of claim 11 wherein the processing system is configured to select the one of the MMEs based on a current UE mobility status.

* * * * *